(12) United States Patent
Peng et al.

(10) Patent No.: US 11,636,620 B2
(45) Date of Patent: Apr. 25, 2023

(54) METHOD FOR POSITIONING SUB-PIXEL CENTERS OF LIGHT SPOTS BASED ON PIXEL MOVEMENT AND CUTTING

(71) Applicant: MLOptic Corp, Redmond, WA (US)

(72) Inventors: Xinyu Peng, Nanjing (CN); Wei Zhou, Sammamish, WA (US)

(73) Assignee: MLOptic Corp., Redmond, WA (US)

( * ) Notice: Subject to any disclaimer, the term of this patent is extended or adjusted under 35 U.S.C. 154(b) by 28 days.

(21) Appl. No.: 17/552,560

(22) Filed: Dec. 16, 2021

(65) Prior Publication Data

US 2022/0272293 A1 Aug. 25, 2022

(30) Foreign Application Priority Data

Feb. 20, 2021 (CN) .......................... 202110192462.8

(51) Int. Cl.
| | |
|---|---|
| *G06T 7/73* | (2017.01) |
| *H04N 25/75* | (2023.01) |
| *H04N 25/71* | (2023.01) |
| *G06T 7/70* | (2017.01) |

(52) U.S. Cl.
CPC .................. *G06T 7/73* (2017.01); *G06T 7/70* (2017.01); *H04N 25/71* (2023.01); *H04N 25/75* (2023.01)

(58) Field of Classification Search
CPC ...... H04N 23/58; H04N 23/687; H04N 25/48; H04N 25/71; H04N 25/75; G06T 7/0002; G06T 7/12; G06T 7/136; G06T 7/62; G06T 7/70; G06T 7/73; G06T 2207/10004; G06T 2207/10016
See application file for complete search history.

(56) References Cited

U.S. PATENT DOCUMENTS 11,137,284 B2 * 10/2021 Takumi ............. H01L 31/02164

OTHER PUBLICATIONS

Bo Hou, et al. "Charge-coupled devices combined with centroid algorithm for laser beam deviation measurements compared to a position-sensitive device," Optical Engineering 50(3), 033603 (Mar. 1, 2011). https://doi.org/10.1117/1.3554379 (Year: 2011).*

* cited by examiner

*Primary Examiner* — Lin Ye
*Assistant Examiner* — Chriss S Yoder, III
(74) *Attorney, Agent, or Firm* — Tracy Jong Law Firm; Tracy P. Jong; Cheng Ning Jong

(57) ABSTRACT

A spot sub-pixel center positioning method based on pixel movement and cutting, the method includes driving the CCD image plane to move along the x direction and the y direction through a displacement platform, selecting target pixels to move and cut the spot, and recording the gray value change of the target pixels, constructing the mapping relationship between gray value and displacement, performing differential transformation on the gray value and displacement curve, and finally performing interpolation fitting to obtain the sub-pixel coordinate value of the center point of the light spot. The measurement accuracy can be maintained within ½ of the single-step displacement of cutting. The method is not only suitable for strong and weak distribution of light spots, but also for fully saturated light spots, and also for asymmetrically distributed and blurred edges. It also has a good measurement effect and can handle a variety of spot scenes.

7 Claims, 4 Drawing Sheets

METHOD FOR POSITIONING SUB-PIXEL CENTERS OF LIGHT SPOTS BASED ON PIXEL MOVEMENT AND CUTTING

PRIORITY CLAIM AND RELATED APPLICATIONS

This non-provisional application claims the benefit of priority from Chinese Pat. App. No. 202110192462.8 filed on Feb. 20, 2021. Said application is incorporated by reference in its entirety.

BACKGROUND OF THE INVENTION

1. The Field of the Invention

The invention relates to a spot center positioning method, in particular to a spot sub-pixel center positioning method based on pixel movement cutting.

2. Background Art

As an important method of automatic image positioning, spot center positioning has been widely used in computer vision, pattern recognition and optical measurement. The most direct way to improve positioning and measurement accuracy is to increase the resolution of the Charge-Coupled Device (CCD), that is, increase the number of pixel dots. However, this method of improving the hardware resolution is very expensive, so the sub-pixel positioning of the image target has become an important technology in high-precision measurement and positioning.

At present, the more common positioning methods include the centroid method, Gaussian distribution fitting method and ellipse fitting and Gaussian cumulative distribution methods. The centroid method is simple and clear, but the algorithm can only achieve ideal results for targets with symmetrical grayscale distribution. The ellipse fitting method is relatively simple and efficient. However, when locating a spot with blurry edges, the choice of threshold has implications on the final positioning result. The Gaussian fitting method can better obtain the spot center with strong and weak distribution while suppressing the influence of noise. However, it cannot obtain position information for a saturated spot.

SUMMARY OF THE INVENTION

In view of the problem that the existing positioning methods in the prior art can only handle a certain specific spot scene, the present invention provides a spot sub-pixel center positioning method based on pixel movement and cutting. The spot center positioning method can handle a variety of light spot scenes.

According to the method of the present invention for spot sub-pixel center positioning based on pixel moving and cutting, the center positioning method drives the CCD image plane to move in the x direction and y direction through a displacement platform, selects the target pixel to move and cut the spot, and records the gray value of the target pixel changes, constructs the mapping relationship between the gray value and the displacement and then differentially transforms the mapping curve of the gray value and the displacement and finally performs the interpolation fitting to obtain the sub-pixel coordinate value of the center point of the light spot.

The above-mentioned method for positioning sub-pixel centers of light spots based on pixel movement and cutting specifically includes the following steps:

(a) Select the pixel with the closest distance to the light spot as the target pixel. The selection method is to select any photosensitive pixel (pixel gray value greater than the photosensitive threshold) as the target pixel. The high-precision displacement platform drives the CCD to move in the x direction several times and uses the target pixel to cut the spot to be measured;

(b) Observe and record the gray value change of the target pixel in step (a), record each displacement at the same time and establish the mapping relationship between the gray value of the target pixel and the displacement:

$$\text{Gray}(k) = f(x_k), k = 1, 2, \ldots, n,$$

where $x_k$ is the coordinate value of the target pixel after each displacement, n is the total number of movements, which represents the Gray(k) value of the target pixel under this displacement;

(c) According to the mapping relationship between the gray value of the target pixel and the displacement obtained in step (b), perform the first-order difference calculation. Here, the forward difference calculation is used:

$$\Delta \text{Gray}(k) = f(x_{k+1}) - f(x_k), k = 1, 2, n-1,$$

where $\Delta\text{Gray}(k)$ represents the result after each difference and the relationship between the gray value and the displacement after the difference is obtained;

(d) Use interpolation and nonlinear least squares to process the relationship between the difference and displacement of the grayscale difference obtained in step (c), and obtain the point with the largest grayscale difference of the corresponding pixel in the spatial domain. This point is the spot center in the x direction and its position is denoted as $x_c$; and (e) In the y direction, using steps (a) to (d), change the displacement platform to drive the CCD to move and cut in the y direction and locate the position of the spot center in the y direction, which is recorded as $y_c$. This will be the position of the spot center coordinate, wherein in step (a), the spot size is smaller than the target pixel size, wherein in step (b), each displacement is equidistant and each movement distance is 1/20 to 1/10 of the spot diameter, wherein in step (c), the specific method of interpolation and nonlinear least squares processing is to use Gaussian fitting to fit the relationship between the gray difference value of the target pixel and the displacement, wherein in step (d), the offset introduced by the forward difference in step (c) is compensated as the final result, and the compensation method is to add ½ target pixel single-step displacement to the result $x_c$.

PARTICULAR ADVANTAGES OF THE INVENTION

Figure 1:
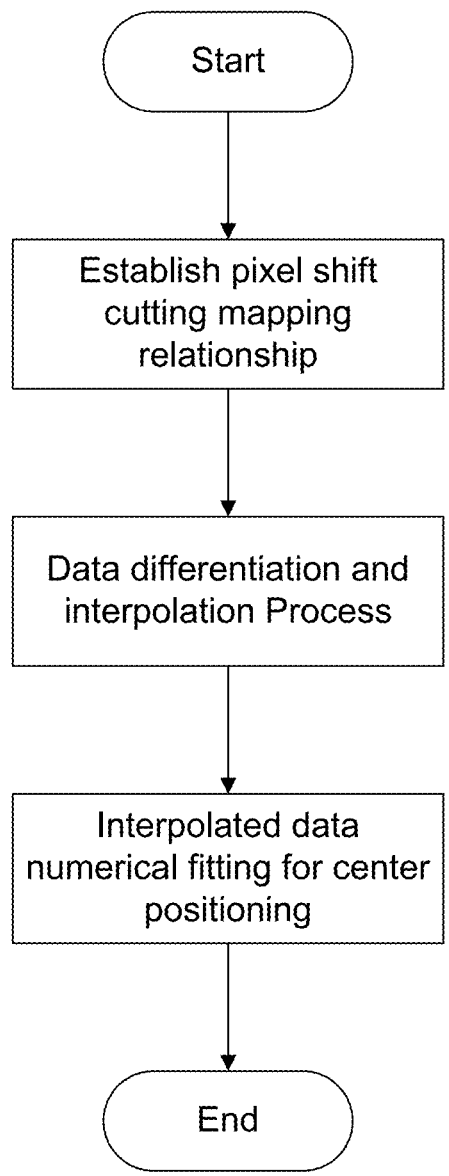
FIG. 1 is a flowchart of a method for positioning sub-pixel centers of light spots based on pixel movement and cutting according to the present invention.
Figure 2:
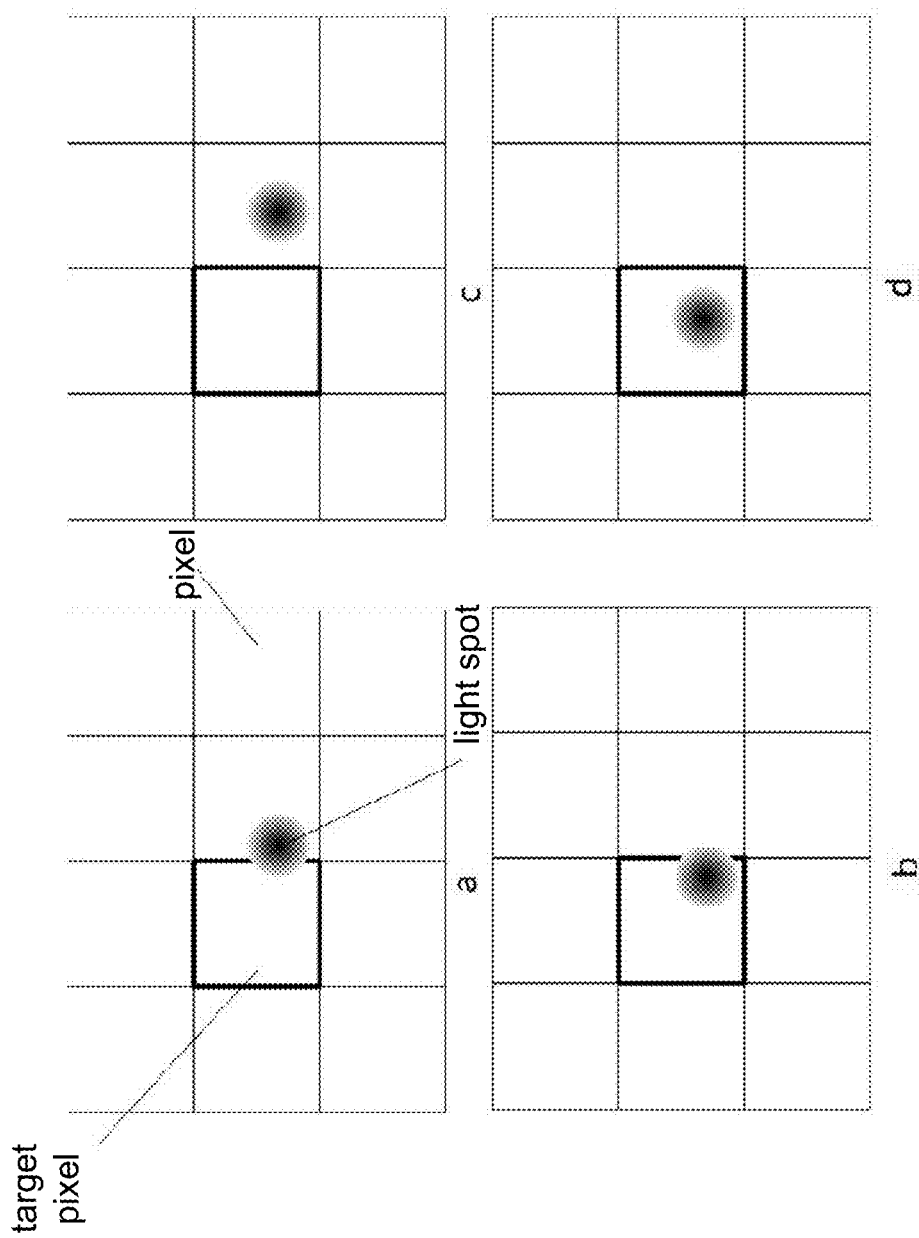
FIG. 2 is a schematic diagram of a pixel cutting spot in the present invention.
Figure 3:
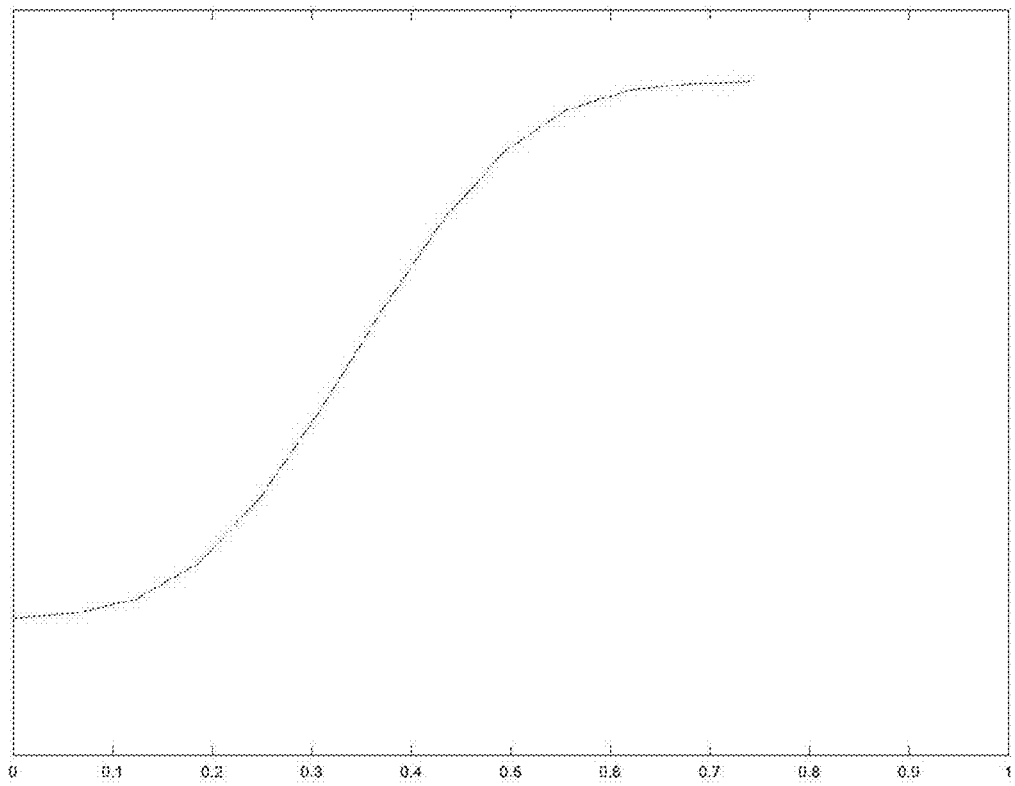
FIG. 3 is a mapping relationship curve between a cutting displacement and the gray value of the corresponding pixel.
Figure 4:
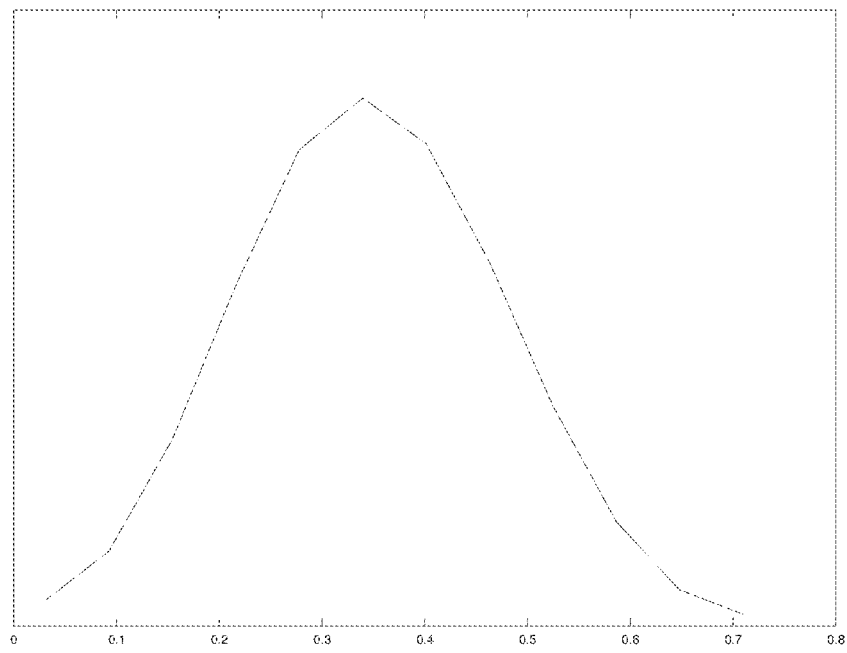
FIG. 4 is the result of the difference of the mapping relationship curve in FIG. 3.

The spot positioning method of the present invention uses a high-precision displacement platform to drive the CCD to perform multiple small displacements in the x and y directions to cut the scanning spot, enable establishment of the relationship between the change in the gray value of the target pixel and the displacement, and perform difference and interpolation fitting operations. Finally, the sub-pixel center coordinates of the target spot are obtained. The measurement accuracy of the method of the present invention can be kept within ½ of the single-step displacement of the cutting and the method is not only suitable for light spots with strong and weak distribution, but also for fully saturated light spots. The method also has a good measurement effect for spots with asymmetrical distribution and blurred edges. It can handle multiple spot scenes and realize spot center positioning for various spot scenes.

DETAILED DESCRIPTION OF A PREFERRED EMBODIMENT

The technical solution of the present invention will be further described below in conjunction with the accompanying drawings. As shown in FIGS. 1 to 6, the spot center positioning method of the present invention uses a high-precision displacement platform to scan in the x and y directions of the CCD image plane and uses the edge of a target pixel to cut the spot to be measured and the gray value of the target pixel is recorded. For the changes in the cutting process, the difference and fitting calculations are used. It is determined that the position with the largest gray value change rate is the center of the light spot when the sub-pixel positioning is realized, the method specifically includes the following steps:

(a) Select the pixel closest to the light spot (as shown in FIG. 2c) as the target pixel. The selection method is to select any photosensitive pixel (pixel gray value greater than the photosensitive threshold) as the target pixel. The high-precision displacement platform drives the CCD to make small multiple movements in the x direction. Starting from FIG. 2c, the target pixel is used to cut the spot to be measured in this sequence: FIG. 2c-FIG. 2a-FIG. 2b-FIG. 2d. The actual spot size to be measured is smaller than the target pixel size;

(b) Observe and record the change in the gray value of the target pixel in step (a), and record each displacement at the same time, and establish the mapping relationship between the gray value of the target pixel and the displacement:

$$\text{Gray}(k)=f(x_k), k=1,2,\ldots,n,$$

where $x_k$ is the coordinate value of the target pixel after each displacement, n is the total number of times of movement, Gray(k) indicating the gray value of the target pixel under this displacement, each displacement is equidistant and the range of each movement distance is the spot diameter 1/20 to 1/10, that is, the range of $(x_{k+1}-x_k)$ is 1/20 to 1/10 of the spot diameter;

(c) According to the mapping relationship between the gray value of the target pixel and the displacement obtained in step (b), the first-order difference operation is performed, and the forward difference is used here:

$$\Delta\text{Gray}(k)=f(x_{k+1})-f(x_k), k=1,2,\ldots,n-1;$$

where $\Delta\text{Gray}(k)$ represents the result after each difference, so the relationship between the gray value after the difference and the displacement can be obtained;

(d) Use interpolation and nonlinear least squares to process the relationship between the difference and displacement of the grayscale difference obtained in step (c), and obtain the point with the largest grayscale difference of the corresponding pixel in the spatial domain, which is the spot center position coordinate in the x direction; the specific method of interpolation and nonlinear least squares processing is to use Gaussian fitting to fit the relationship between the gray difference and displacement of the target pixel;

At the same time, the offset introduced by step (c) forward difference is compensated as the final result. The compensation method is to add ½ target pixel single-step displacement to the result $x_c$; and (e) In the y direction, using the method of steps (a)~(d), change the displacement platform to drive the CCD to move and cut in the y direction, which can be positioned to the position coordinate of the spot center in the y direction; $(x_c, y_c)$ will be used as the spot center of the location coordinates.

Figure 5:
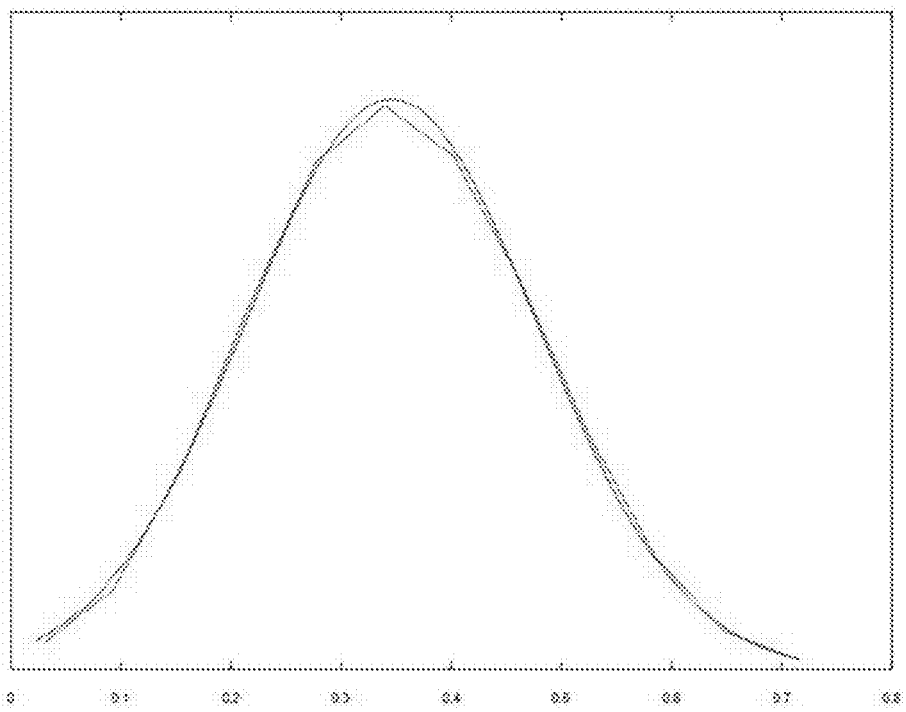
FIG. 5 is the result of FIG. 4 after interpolation fitting.
Figure 6:
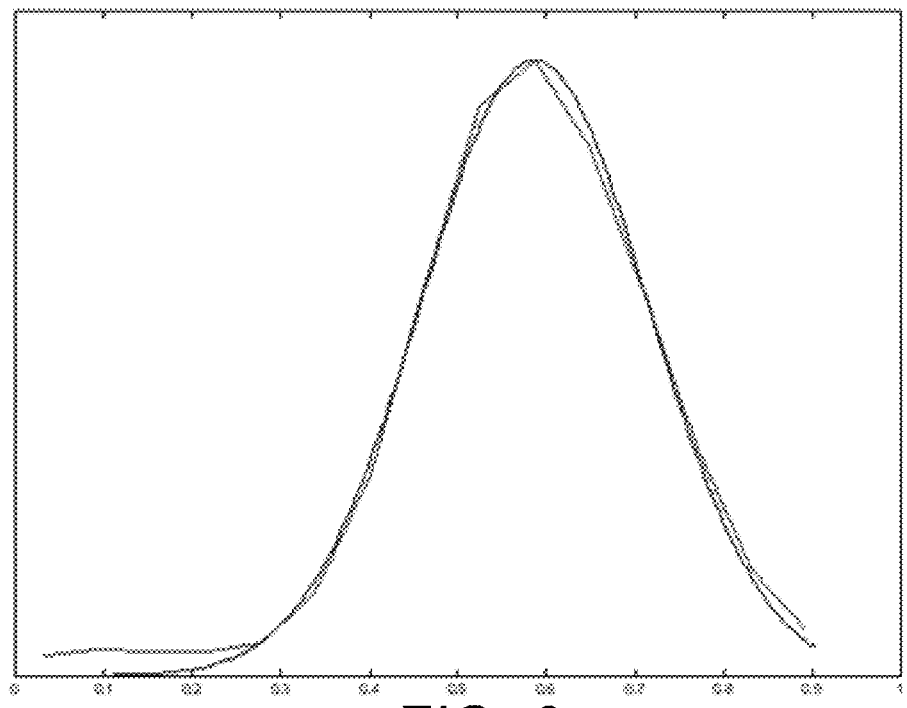
FIG. 6 shows the result of cutting in the y direction using the same method.

FIGS. 5 and 6 show that the spot center coordinates obtained based on the method of the present invention are (0.3455, 0.5864) and the original spot coordinates are (0.3442, 0.5877), which can explain that the error of the spot sub-pixel positioning method of the present invention is less than 1% of pixels. The accuracy of spot center positioning is at the sub-pixel level.

What is claimed herein is:

1. A spot sub-pixel center positioning method based on pixel movement cutting, said method comprising: driving a CCD image plane to move in the x direction and y direction through a displacement platform, selecting the target pixel to move and cut the spot, recording the gray value of the target pixel changes and constructing the mapping relationship between the gray value and the displacement, performing differential transformation on the gray value and displacement mapping curve, and finally performing interpolation fitting to obtain the sub-pixel coordinates of the center point of the light spot.

2. The method according to claim 1, further comprising:
   (a) selecting the pixel with the closest distance to the light spot as the target pixel, driving the CCD to move in the x-direction through the displacement platform several times and using the target pixel to cut the light spot;
   (b) observing and recording the gray value change of the target pixel in step (a), and recording each displacement at the same time and establishing the mapping relationship between the gray value of the target pixel and the displacement:

$$\text{Gray}(k)=f(x_k), k=1,2,\ldots,n,$$

where $x_k$ is the coordinate value of the target pixel after each displacement, n is the total number of movements, Gray(k) represents the gray value of the target pixel under this displacement;
   (c) according to the mapping relationship between the gray value of the target pixel and the displacement obtained in step (b), performing the first-order difference calculation, wherein the following forward difference calculation is used:

$$\Delta\text{Gray}(k)=f(x_{k+1})-f(x_k), k=1,2,\ldots,n-1,$$

where $\Delta\text{Gray}(k)$ represents the result after each difference and the relationship between the gray value and the displacement after the difference $\Delta\text{Gray}(k)$ is obtained;
   (d) performing interpolation and nonlinear least squares to process the relationship between the difference and displacement of the grayscale difference obtained in step (c) and obtaining the point with the largest grayscale difference of the corresponding pixel in the spatial domain, wherein the point is the spot center in the x direction, the position coordinates of the spot denoted as $x_c$; and (e) in the y direction, using steps (a) to (d), change the displacement platform to drive the CCD to move and cut in the y direction and locate the position coordinates of the spot center in the y direction as $y_c$, wherein ($x_c$,$y_c$) indicates the position coordinates of the spot center.

3. The method according to claim 2, wherein said selecting step comprises selecting any photosensitive pixel as the target pixel, wherein the pixel gray value is greater than a sensitivity threshold.

4. The method according to claim 2, wherein the light spot size of said selecting step is smaller than the target pixel size.

5. The method according to claim 2, wherein each said displacement of said observing and recording step is equidistant and the distance of each said movement is ¹/₂₀ to ¹/₁₀ of the diameter of the light spot.

6. The method according to claim 2, wherein in step (d), the specific method of interpolation and nonlinear least squares processing is to adopt Gaussian fitting to the the relationship between the gray difference value of the target pixel and the displacement of the target pixel.

7. The method according to claim 2, wherein in step (d), the offset introduced by step (c) forward difference is compensated by a compensation method as the final result, wherein said compensation method is to add ½ target pixel single-step displacement to the result $x_c$.

* * * * *